Figure 1:
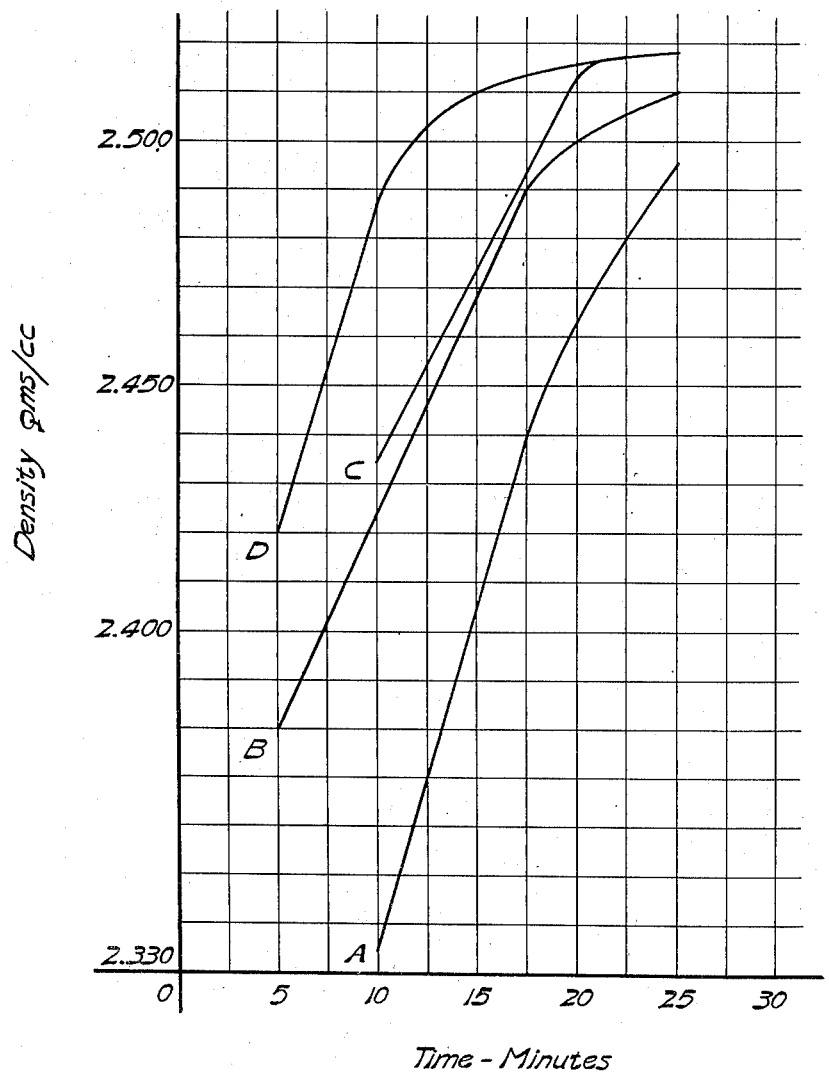

May 8, 1951  J. P. POOLE  2,552,495
METHOD OF MAKING GLASS AND BATCH THEREFOR
Filed Sept. 20, 1947  2 Sheets-Sheet 1

INVENTOR.
James P. Poole
BY
Bean, Brooks, Buckley & Bean.
ATTORNEYS

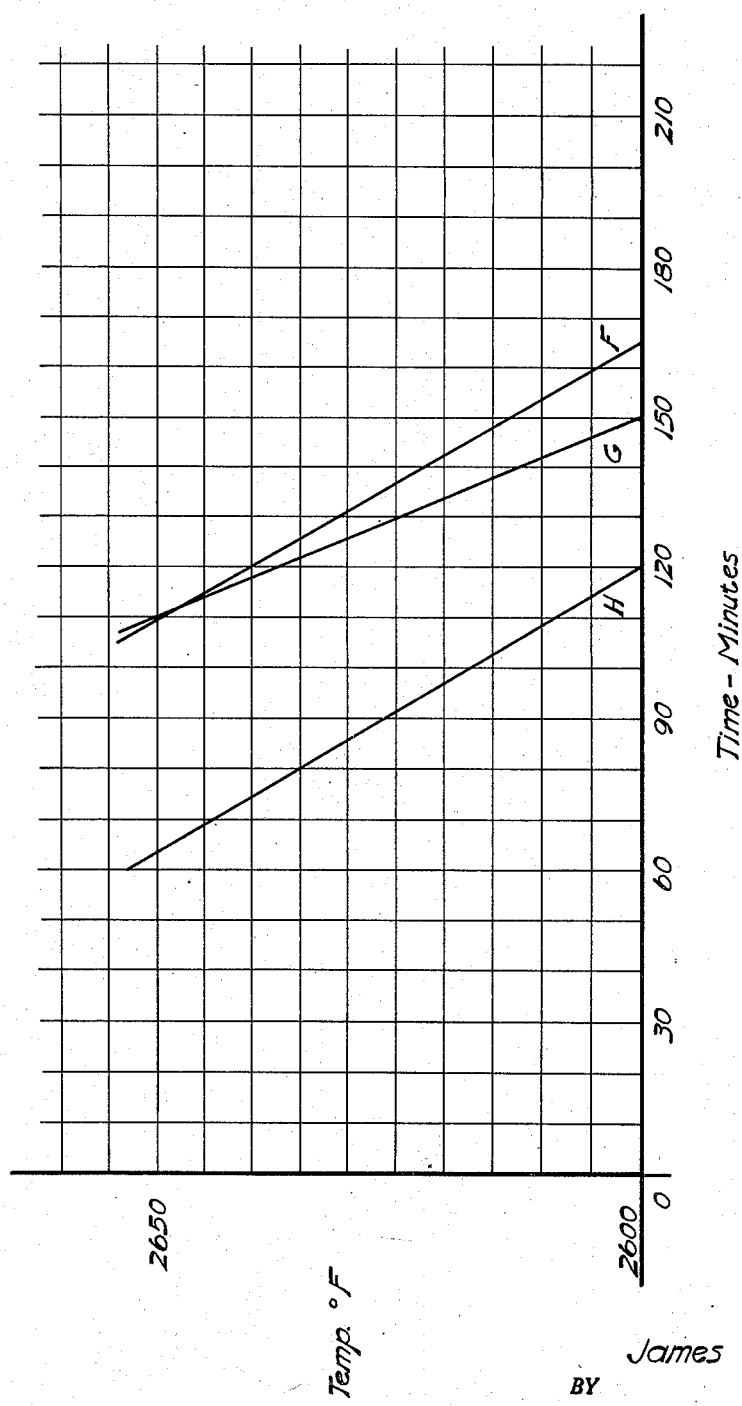

Patented May 8, 1951

2,552,495

UNITED STATES PATENT OFFICE 2,552,495

METHOD OF MAKING GLASS AND BATCH THEREFOR

James P. Poole, State College, Pa., assignor to Brockway Glass Co., Inc., Brockway, Pa.

Application September 20, 1947, Serial No. 775,367

7 Claims. (Cl. 106—52)

The present invention relates to the glass making art and more particularly to a glass batch and a method of making glass.

In glass of the soda-lime type the economy factor is of great importance, and one of the most important cost factors is that of melting and fining the glass batch. In the prior art various attempts have been made to minimize the melting and fining time by varying the percentage composition of the batch, both by varying the percentage relationship of sand, soda and lime, the chief constituents, and by varying the percentage and identity of various minor constituents such as fluorine, bivalent oxides such as CaO, MgO, ZnO and BaO, and certain mixed oxides such as $Al_2O_3$.

The present invention provides a glass batch and a glass making method wherein the melting and fining is very materially improved and the time shortened by a new particle size relationship of the principal ingredients. Thus markedly improved melting and fining results by employing a glass batch whose qualitative and quantitative chemical composition is the same as known prior art batches, but wherein a decidedly different particle size range is employed, both as to the absolute particle sizes of the sand and soda and also as to the ratios of the particle sizes of these constituents to each other and to the lime constituent.

In conventional commercial soda-lime glass batches the sand particle sizes range from 40 to 60 mesh, the soda particle sizes from 20 to 40 mesh, and the lime particle sizes from 20 to 40 mesh. It will be noted that the particle size ratio of sand to soda is from $$\frac{1.5 \text{ to } 2}{1}$$

I have found that a surprising reduction in melting time may be attained with known soda-lime glass batches without varying the percentage composition of the batch by using much finer sand and soda and by reversing their particle size relationship. The improvement cannot be attributed to the mere use of the ingredients in a finer state of subdivision, since no particularly improved results are noted when finer particles are used in the previously known particle size ratios, as will later appear.

Specifically, I have found that markedly superior melting and fining result when the sand particle size is minus 100 mesh and the soda particle size minus 140 mesh, the lime remaining at 20 to 40 mesh. Commercial sand and soda referred to as minus 100 mesh and minus 140 mesh, respectively, will include considerable percentages of finer material, probably up to 300 or 400 mesh. However, the limitations of the terms minus 100 mesh and minus 140 mesh are well understood by those skilled in the glass making art. Note that in batches prepared according to my invention the ratio of soda to sand size is $$\frac{1 \text{ to } 1.5}{1}$$

a reversal of the prior art teachings.

The novel principles herein disclosed are believed to be applicable to all workable soda-lime glass batches. The following table indicates in general the quantitative limits of the principal ingredients. The percentages given, by weight, are those which would be determined by chemical analysis of the resultant glass:

Table 1

| Material | Low Limit | High Limit |
|---|---|---|
| $SiO_2$ | 68.0 | 80.0 |
| $R_2O_3$ | 1.2 | 4.0 |
| RO | 2.0 | 14.0 |
| Alkali | 8.0 | 15.5 |
| Fluorine | 0 | 1.2 |

In the above table $R_2O_3$ includes certain mixed oxides, principally $Al_2O_3$ and also certain relatively small amounts of impurities, such as iron (calculated as $Fe_2O_3$). The term RO in Table 1 includes bivalent oxides, specially CaO, MgO, ZnO and BaO. Generally calcium oxide (CaO) is the principal constituent of this group. The alkali is usually principally $Na_2O$ although certain amounts of $K_2O$ may be included.

The following percentage compositions were tested in a wide variety of particle sizes and in a great number of ways to substantiate the efficacy of the unique particle size and particle size ratio set forth herein and tests on all of the compositions substantiated the conclusions set forth hereinabove:

Table 2

| Material | Composition Number | | | |
|---|---|---|---|---|
| | 1 | 2 | 3 | 4 |
| $SiO_2$ | 72.83 | 72.03 | 72.5 | 71.5 |
| $Na_2$ | 14.51 | 15.05 | 14.87 | 13.2 |
| CaO | 10.07 | 11.13 | 10.0 | 12.0 |
| $Al_2O_3$ | 2.16 | 1.03 | 2.2 | 1.79 |
| $F_2$ | .26 | .25 | .27 | .25 |
| $SO_3$ | | .25 | .27 | .25 |

The percentages, by weight, are those which would result from tests of the glass produced.

The following table gives the starting batch raw materials used in example compositions Nos. 1 through 3 of Table 2, the number of parts of each of the raw materials being given by weight:

*Table 3*

| Material | Composition Number | | |
|---|---|---|---|
| | 1 | 2 | 3 |
| Sand | 8,000 | 9,000 | 8,000 |
| Soda | 2,669.7 | 3,175 | 2,697.1 |
| Lime | 2,059.6 | 2,525 | 2,040 |
| Syenite | 1,021.3 | 946 | 1,047.4 |
| Salt Cake | | 90 | 77.7 |
| Fluorspar | 62.7 | 90 | 66 |
| Barytes | | 45 | |

The accompanying drawings illustrate graphically the results of tests which measure the degree of improvement resulting from the present invention.

In the drawings:

Fig. 1 is a graph showing relative time-density curves for compositions of various particle size relationships; and Fig. 2 is a graph which plots the seed count of composition No. 1 with respect to time and temperature for several particle size relationships.

It is to be understood that the compositions represented by the curves of Fig. 1 are identical qualitatively and quantitatively, the particle size relationship being the only variable. The same is true of the several curves of Fig. 2.

In discussing the tests illustrated in Figs. 1 and 2 we shall, for convenience, use the terms "coarse sand," "coarse soda," "coarse lime," "fine sand," "fine soda," and "fine lime." By "coarse" sand, soda and lime is meant the particle size hereinbefore set forth as conventional in the prior art. By "fine sand" is meant the minus 100 mesh specified for procedure according to the present invention and by "fine soda" is meant the minus 140 mesh so specified.

Fig. 1 is concerned chiefly with the melting phase of composition Number 2. The melting was at 2700° F. and each curve is the average of five tests. The following particle relationships were used, it being borne in mind that all four tests are of identical batch percentage composition, namely, No. 2 of Table 2:

A. Coarse sand, soda and lime
B. Fine sand, soda and lime
C. Fine sand, coarse soda and lime
D. Fine sand and soda, coarse lime The signficant indication of the four curves of Fig. 1 is, in each case, the point where the straight upward line begins to curve to the right. This is the point of "batch disappearance," when the ingredients are fully melted and fining begins. It will be noted that with respect to curve A this critical point is not reached within the limits of the graph (25 minutes), the minute curvature of the upper portion of A is non-indicative. With respect to curves B and C the point of batch disappearance is reached at 17.5 and 20 minutes, respectively. With respect to curve D, the particle relationship of the present invention, melting ends at 10 minutes.

Note that there is only a slight difference between the melting time indicated by curves B and C, in the former case with all chief constituents fine and in the latter with only the sand fine. This shows the importance of the relationship between soda and sand particle size in the present invention.

Turning now to Fig. 2 we find three glass batches, all having the identical percentage composition of composition No. 1 of Table 2. The plotted lines are a measure of the fining times at various temperatures, fining being considered complete when the melt reaches a practically seed-free count, and are each of the following particle size composition:

Line F. Coarse sand, soda and lime
Line G. Fine sand, coarse soda and lime
Line H. Fine sand and soda, coarse lime The vary marked reduction in fining time at all temperatures indicated by line H for the particle size relationship of the present invention is obvious from mere inspection.

What is claimed is:

1. The method of making soda lime glass comprising mixing together sand of minus 100 mesh particle size, lime of 20 to 40 mesh particle size, alkali of minus 140 mesh particle size, alumina, a fluoride and fining agents which are collectively oxidizing in character in such proportions as to give upon melting glass having an analysis calculated from the constituents of the batch mixture 68 to 80% $SiO_2$, 1.2 to 4.0% $R_2O_3$, 2 to 14% RO, 8.0 to 15.5% alkali and fluorine up to 1.2%, and melting and fining the batch mixture to form clear glass.

2. The method of making a soda-lime type glass comprising mixing together the following ingredients in substantially the following proportions by weight:

| | |
|---|---|
| Sand of minus 100 mesh | 8000 |
| Soda of minus 140 mesh | 2669.7 |
| Lime of 20 to 40 mesh | 2059.6 |
| Syenite | 1021.3 |
| Fluorspar | 62.7 | and melting and fining the same to form glass.

3. A batch for making a soda-lime type glass comprising sand of minus 100 mesh, alkali of minus 140 mesh, lime of 20 to 40 mesh, alumina and a fluoride mixed in such proportions that the glass made therefrom will have a composition as determined by calculation from the batch of 68 to 80% $SiO_2$, 1.2 to 4.0% $R_2O_3$, 2 to 14% RO, 8.0 to 15.5% alkali, and fluorine up to 1.2%.

4. A batch for making a soda-lime type glass comprising the following ingredients in substantially the weight proportions given:

| | |
|---|---|
| Sand of minus 100 mesh | 8000 |
| Soda of minus 140 mesh | 2669.7 |
| Lime of 20 to 40 mesh | 2059.6 |
| Syenite | 1021.3 |
| Fluorspar | 62.7 |

5. A batch for making a soda-lime type glass comprising the following ingredients in substantially the weight proportions given:

| | |
|---|---|
| Sand of minus 100 mesh | 8000 |
| Soda of minus 140 mesh | 2669.7 |
| Lime of 20 to 40 mesh | 2059.6 |
| Syenite | 1021.3 |
| Fluorspar | 62.7 | the glass made from melting this batch having a composition of 72.83% $SiO_2$, 14.51% $Na_2O$, 10.007% CaO, 2.16% $Al_2O_3$ and 0.26% $F_2$.

6. A glass batch containing approximately 80 parts by weight of sand of minus 100 mesh, approximately 27 parts by weight of alkali of minus 140 mesh, approximately 20 parts by weight of lime of 20 to 40 mesh, and approximately 11 parts by weight of other glass making ingredients.

7. A glass batch containing approximately 80 parts by weight of sand, 27 parts by weight of alkali, 20 parts by weight of lime, and 11 parts by weight of other glass making ingredients the alkali particles being smaller than the sand particles and both being smaller than 100 mesh, the line particles being between 20 and 40 mesh.

JAMES P. POOLE.

REFERENCES CITED

The following references are of record in the file of this patent:

UNITED STATES PATENTS

| Number | Name | Date |
|---|---|---|
| 2,049,359 | Dusing et al. | July 28, 1936 |
| 2,182,384 | McGregor | Dec. 5, 1939 |
| 2,220,750 | Bair et al. | Nov. 5, 1940 |
| 2,239,551 | Dalton et al. | Apr. 22, 1941 |
| 2,245,473 | Garbisch | June 10, 1941 |
| 2,262,951 | Lyle | Nov. 18, 1941 |
| 2,269,059 | McLachlan | Jan. 6, 1942 |
| 2,313,566 | McGregor | Mar. 9, 1943 |
| 2,366,473 | Bair | Jan. 2, 1945 |
| 2,443,142 | Lyle | June 8, 1948 |

FOREIGN PATENTS

| Number | Country | Date |
|---|---|---|
| 2,680 | Denmark | 1899 |
| 544,924 | Germany | 1932 |

OTHER REFERENCES

The Glass Industry, June 1936, page 193.
Journal of the American Ceramic Society, Nov. 1939, page 381.